(12) United States Patent
Soyannwo et al.

(10) Patent No.: US 9,491,033 B1
(45) Date of Patent: Nov. 8, 2016

(54) AUTOMATIC CONTENT TRANSFER

(71) Applicant: Rawles LLC, Wilmington, DE (US)

(72) Inventors: Olusanya Temitope Soyannwo, San Jose, CA (US); Kurt Wesley Piersol, San Jose, CA (US); Kavitha Velusamy, San Jose, CA (US); Tina Yung-Ting Chen, San Jose, CA (US); Edward Dietz Crump, Santa Cruz, CA (US)

(73) Assignee: Amazon Technologies, Inc., Seattle, WA (US)

( * ) Notice: Subject to any disclaimer, the term of this patent is extended or adjusted under 35 U.S.C. 154(b) by 332 days.

(21) Appl. No.: 13/867,892

(22) Filed: Apr. 22, 2013

(51) Int. Cl.
| | | |
|---|---|---|
| *G06F 15/173* | (2006.01) | |
| *H04L 29/08* | (2006.01) | |
| *G10L 17/22* | (2013.01) | |
| *G01S 3/802* | (2006.01) | |

(52) U.S. Cl.
CPC .......... *H04L 29/0845* (2013.01); *G01S 3/802* (2013.01); *G10L 17/22* (2013.01)

(58) Field of Classification Search
CPC .............. H04L 63/08; H04L 63/0861; H04M 2250/00; H04M 2250/02; H04M 2250/04; H04M 2250/06; H04M 2250/64; H04M 2250/74; G10L 17/22; G01S 3/802
USPC ........................................................ 709/226
See application file for complete search history.

(56) References Cited

U.S. PATENT DOCUMENTS

| | | | | |
|---|---|---|---|---|
| 5,182,552 A | * | 1/1993 | Paynting ................ | H04B 1/205 340/12.5 |
| 5,657,425 A | * | 8/1997 | Johnson .................. | G10L 15/24 704/275 |
| 6,654,720 B1 | * | 11/2003 | Graham .................... | G06F 3/16 704/270 |
| 7,418,392 B1 | | 8/2008 | Mozer et al. | |
| 7,720,683 B1 | | 5/2010 | Vermeulen et al. | |
| 7,774,204 B2 | | 8/2010 | Mozer et al. | |
| 9,020,825 B1 | * | 4/2015 | Garber .................... | G06F 3/167 704/231 |
| 2003/0033150 A1 | * | 2/2003 | Balan ....................... | G10L 15/22 704/275 |
| 2004/0225904 A1 | * | 11/2004 | Perez et al. ................... | 713/320 |
| 2011/0051016 A1 | * | 3/2011 | Malode ........................ | 348/734 |
| 2011/0069841 A1 | * | 3/2011 | Angeloff .................. | H03G 3/30 381/17 |
| 2011/0142413 A1 | * | 6/2011 | Kang et al. .................... | 386/234 |
| 2011/0307576 A1 | * | 12/2011 | Miyoshi .................. | H04L 67/04 709/217 |
| 2012/0166985 A1 | * | 6/2012 | Friend et al. ................. | 715/765 |
| 2012/0223885 A1 | | 9/2012 | Perez | |
| 2013/0183944 A1 | * | 7/2013 | Mozer .................. | H04L 12/282 455/414.1 |
| 2013/0195285 A1 | * | 8/2013 | De La Fuente .... | G07C 9/00158 381/92 |

(Continued)

FOREIGN PATENT DOCUMENTS

WO    WO2011088053 A2    7/2011

OTHER PUBLICATIONS

Pinhanez, "The Everywhere Displays Projector: A Device to Create Ubiquitous Graphical Interfaces", IBM Thomas Watson Research Center, Ubicomp 2001, Sep. 30-Oct. 2, 2001, 18 pages.

*Primary Examiner* — Imad Hussain
(74) *Attorney, Agent, or Firm* — Lee & Hayes, PLLC

(57) ABSTRACT

A computing system with multiple devices local to an environment facilitates active transfer among the multiple devices as a user moves about the environment. The devices may sense a presence or non-presence of the user and attempt to coordinate transfer to a device proximal to the user. In another implementation, the devices may communicate with a remote system that monitors a location of the user within the environment and causes content associated with the user to transfer between computing devices of the system based on the location and movement of the user.

24 Claims, 7 Drawing Sheets

(56) References Cited

U.S. PATENT DOCUMENTS

| | | | |
|---|---|---|---|
| 2014/0043943 A1* | 2/2014 | Lavery | G01S 1/74 367/118 |
| 2014/0045515 A1* | 2/2014 | Austin | H04W 4/04 455/456.1 |
| 2014/0136195 A1* | 5/2014 | Abdossalami | G10L 15/26 704/235 |
| 2015/0026708 A1* | 1/2015 | Ahmed | H04N 5/23206 725/12 |
| 2015/0373477 A1* | 12/2015 | Norris | H04S 7/304 381/303 |

* cited by examiner

AUTOMATIC CONTENT TRANSFER

BACKGROUND

The use of whole home computing systems and ubiquitous computing devices are becoming more and more common. Many new homes and offices are built fully wired, while many old homes and offices utilize various wireless systems. Many different ways have been introduced to allow users to interact with computing devices, such as through mechanical devices (e.g., keyboards, mice, etc.), touch screens, motion, gesture, and even through natural language input such as speech.

As computing devices in homes and offices continue to evolve, users expect a more seamless experience when moving from room to room and/or from device to device. One of the challenges for multi-device home or office systems is how to transfer content between multiple devices in multiple locations.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Overview

Figure 1:
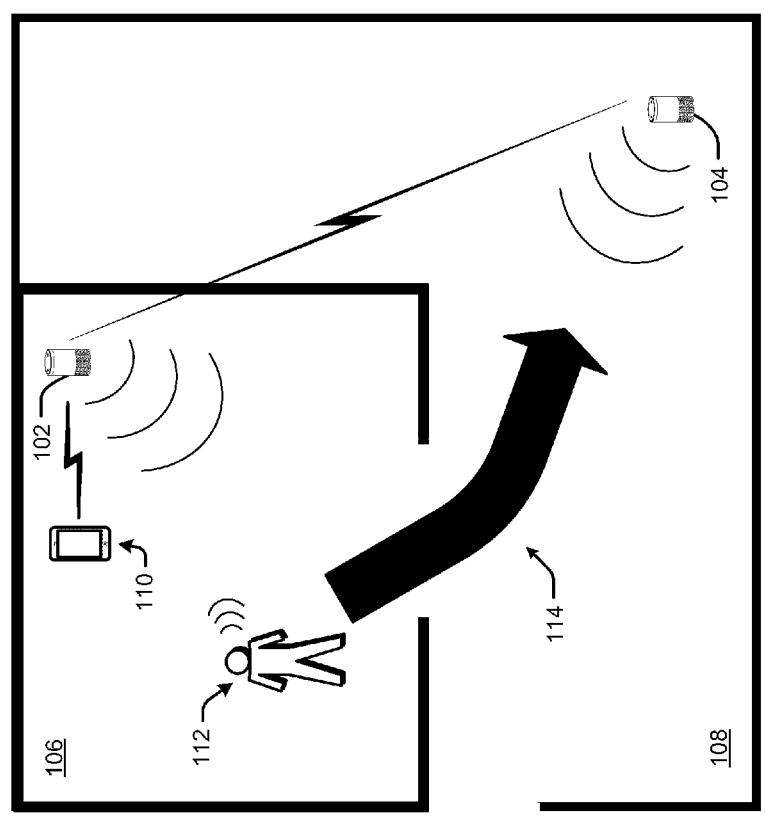
FIG. 1 illustrates an example environment including a home with multiple computing devices to show active transfer of content between computing devices as a user changes locations within the home.

This disclosure includes techniques and implementations to improve performance of home and office computing systems. One way to improve performance is to provide seamless content transfer between devices of the computing system. For instance, in systems with multiple computing devices, each computing device is configured to recognize individual users and, in response, request, load and/or hand off the user's profile and content from/to other computing devices.

The techniques described herein achieve content and profile transfer between devices by identifying users based on any number of processes, including speech recognition, visual tracking, beamforming, sound triangulation, and/or user activation. Accordingly, the computing devices may be equipped with one or more microphones to capture sound from the environment, one or more speakers to output audio into the environment and/or one or more video capturing components (i.e., one or more cameras) to capture visual information from the environment. In some situations, the computing devices may function independently from each other, being equipped with computing and/or memory capabilities, and hence able to detect the presence of one or more users. In other implementations, the transfer of content between the computing devices may be coordinated by a central computing system or cloud service.

In one implementation, each of the computing devices is aware of the location of the other computing devices, as well, as any content and/or user profiles active on the other computing devices. This awareness may be achieved through use of local ad hoc networks, such as a wireless network (e.g., Wifi, Bluetooth®, etc.). Each computing device may also be configured to capture audio and/or visual information from the surrounding environment and to identify users in the environment based on the audio and/or visual information.

In some examples, a computing device, upon recognizing a specific user, may request a transfer or relay of the specific user's profile and/or content from another computing device. For example, suppose that a user is listening to music using a first computing device located in the living room and that a second computing device is located in the home office. Further suppose that the user moves from the living room to the office. In response to the user movement, the first computer may detect that the user is moving away and attempt to locate other devices, such as the second computing device in the office. Alternatively, or additionally, the second computing device may detect the presence of the user as the user enters the office. Once the first computer identifies a more proximal computing device, or the second computing device detects the presence of the user, the music may be transferred from the first computing device to the second computing device, such that the user experiences a seamless transition from the living room to the office, perhaps even without knowledge of the transition.

In some examples, the first computing device may also provide the second computing device profile information, in addition to the music (i.e., the content), such that the user settings (e.g., volume of the music) is maintained during the content transfer. As used herein the "profile information" may include an identity of the user, authentication credentials, permissions, subscriptions, logon credentials (i.e., passwords and user names), contact lists (e.g., emails, phone numbers, etc.), settings, preferences, play lists, lists/indexes of electronic consumable content (e.g., favorite applications, most visited websites, preferred media content, etc.), histories (such as shopping or browsing histories), health history and/or personal information.

In the implementation where the first computing device initiates the transfer of the music, the first computing device may begin the initiation when it no longer detects the presence of the user. For instance, the first computing device may query the second device to determine if the second computing device is able to detect sound related to the user and if the second computing device responds in the affirmative, the first computing device may transfer the content and the profile information. In one particular example, the first computing device may cause the second computing device to query the user for an audible response, which the second computing device may verify using speech recognition.

In another implementation, the user may initiate a content transfer request. For example, the user may enter the office and speak one or more commands or wake words to cause the second computing device to activate and verify the user. Upon activation, the second computing device may query the other devices, including the first computing device, to request a transfer of the user's content and profile information.

In some implementations, a central coordinating system, such as a cloud service, may coordinate the transfer of the content to the second computing device. For example, the cloud service may receive audio information and/or visual information from each of the computing devices, analyze the audio and/or visual information and transfer content between the devices based on the analysis. For example, if the user moves from a position near the first computing device to a position near the second computing device, the cloud services may transfer the content from the first computing device to the second computing device. For instance, if the cloud service was streaming music to the first device, the cloud service may stop providing the music to the first computing device and start streaming the music to the second computing device.

In one particular implementation, sound localization techniques or triangulation may be applied, using multiple devices with audio capabilities, to detect noise associated with a user, as the user moves throughout the home and to transfer the user's profile and content. For example, the user may be talking on the phone via the computing system, while moving from the living room to the office. The computing devices may be configured to detect the voice of the user, as the user moves, and measure the strength of the audio signal captured. The phone call may be transferred from one computing device to the next as the strength of the sound related to the user captured by each of the devices varies. In this manner, the phone call may be transferred from device to device ahead of the user, such that the user is able to conduct the conversation while moving through the home.

In another implementation, the user's movements may be tracked by monitoring a signal of a device associated with a particular user. For example, a wireless signal of a mobile phone, a wirelessly enabled watch or glasses (such as Google Glass®), a personal digital assistant (PDA), a tablet device, or other portable wireless device may be used to track the movement of the user and to transfer content between computing devices. In this implementation, the user may carry a smart phone as the user moves from room to room. The computing devices may be configured to detect a smart phone identifier and/or communication between the smart phone and a wireless router and to transfer the content to the detecting device. In one particular example, the device associated with the user may be configured to emit a characteristic sound (either audible or inaudible to people) on a periodic basis. For instance, an application may be installed on a smart phone or tablet device that causes the smart phone to emit the characteristic sound and/or the wireless signal. The computing devices may then be configured to transfer the content by tracking the characteristic sound or wireless signal as the smart phone or tablet is moved.

In some implementations, the verification/security credentials may be transferred, in addition to the content and profile information. For example, a user may have authenticated on the first computing device, for instance, by entering a password. As the user moves to the office, the first computing device may transfer the verification information (the password and identity of the user) to the second computing device, such that the second computing device is able to accept the authentication by the first computing device or independently authenticate the user. For instance, the second computing device may contain its own permission list with respect to various users of the system. In one example, the second computing device located in the office may have additional parental controls; over and above, the parental controls of the first computing device (e.g., children may not be authorized to use the second computing device in the office). In this way, the second computing device may verify that the user is an authorized user of the second computing device based on the verification information before the first computing device transfers the content and profile information.

In some implementation, the various operations to implement content transfer among multiple computing devices may be split among the computing devices and a remote cloud computing systems to which the computing devices may be coupled via a network. Different modules and functionality may reside locally in the devices proximal to the user, or remotely in the cloud servers. For instance, a cloud system or central control system may perform the verification of the user's identity. In one particular example, the cloud system may stream the content to the active computing device and, upon a change in the active computing device, implement a change in the computing device receiving the streaming content.

Illustrative Environment

FIG. 1 illustrates an example environment including a home 100 with multiple computing devices 102 and 104 located in rooms 106 and 108, respectively. The computing devices 102 and 104 may be implemented as any of a number of devices and in any number of ways, such as a wired or cellular telephones, various mobile and stationary computing devices, conferencing devices, various speaker systems, and/or any number of other electronic devices capable of capturing sound at one or more microphones and outputting audio at one or more speakers. In one particular example, the computing devices are voice controlled assistant devices, which are configured to assist users in performing various tasks by receiving verbal requests and providing audible responses.

In the illustrated implementation, the computing devices 102 and 104 are positioned in different rooms 106 and 108 of the home 100. The computing devices 102 and 104 may be placed in any number of places (e.g., an office, store, public place, etc.) or locations (e.g., ceiling, wall, in a lamp, beneath a table, under a chair, etc.). In some instances, multiple computing devices, such as computing devices 102 and 104, may be located in the same room. In one particular example, the computing devices 102 and 104 may be configured to communicate with and/or access other electronic devices within the home 100 to perform various functions or tasks, for example, mobile phone 110.

As illustrated, the mobile phone 110 is located in room 106 and in communication with computing device 102. For example, the mobile phone may be paired with the computing device 102, such that a piconet or other local ad hoc network between the mobile phone 110 and the computing device 102 is formed. In this way, the computing device 102 is able to transfer the incoming calls to or receive outgoing calls from any other devices in the system, such as the computing device 104. Thus, as illustrated, a user 112 is able to conduct a phone conversation over the mobile phone 110 via computing device 102 and 104, while moving from room 106 to room 108. In some examples, the computing device 102 may have built in phone capabilities, such that a call may be received directly by the computing device 102 and/or other devices of the system and the user may answer the call on one the computing devices without the mobile phone 110 being involved.

In an example scenario, assume the user 112 is participating in a conversation, while the mobile phone 110 is recharging (i.e., the mobile phone 110 remains in room 106 as the user 112 moves to room 108). Thus, initially, the computing device 102 is capturing the user's voice and outputs audio into room 106. As depicted in the illustrated example, the user 112 may begin to move from room 106 into room 108 along path 114. As the user moves along path 114, the computing device 102 continues to capture sounds related to the user's voice.

In one implementation, the computing device 102 may analyze the captured sounds to determine a distance from the computing device 102 and a direction of movement of the user 112. For example, the computing device 102 may determine that the user 112 is moving out of range based on audio signal strength, sound mapping, monitoring Doppler shifts, beam forming, triangulation, and/or a combination of the above mentioned techniques for detecting the position and movement of the user 112. In another implementation, the computing device 102 may include one or more cameras or video capturing components, which the computing device 102 may utilize to track the movement of the user 112. In one particular implementation, the computing devices 102 and 104 may be configured to detect the presence of a wireless or Bluetooth® enabled device associated with the user 112 and to track the movement of the user 112 based on communications with the wireless or Bluetooth® enabled device. Either the computing devices 102 and 104 or the wireless or Bluetooth® enabled device may simultaneously emit a chirp (e.g., an ultrasonic chirp) and a Bluetooth signal. The chirp will travel at the speed of sound, and the Bluetooth signal will travel at the speed of light. The receiving device (either the wireless or Bluetooth® enabled device or computing devices 102 and 104) may receive the chirp and Bluetooth signal use the difference in receiving times to compute the distance between the sending and receiving device. When this procedure is performed for both computing devices 102 and 104, the location of the user 112 may be determined using triangulation and the beamformers of the computing devices 102 and 104. Once the computing device 102 confirms that the user 112 is moving from room 106 to room 108, the computing device 102 may transfer the call (i.e., the content) to computing device 104. Thus as the user 112 enters room 108, the user 112 may continue to participate in the conversation via the computing device 104. In this way, the user 112 experiences a seamless content transfer between the computing device 102 in room 106 and the computing device 104 in room 108. In some instances, the computing device 102 may act as a relay between the mobile phone 110 and the computing device 104, as illustrated. In other instances, the mobile phone 110 may be able to communicate directly with the computing device 104.

In some implementations, the computing device 104 may also load profile information corresponding to user 112. In some cases, the profile information is transferred from the computing device 102 along with the content. For example, volume settings obtained from the mobile phone 110. In other cases, the profile information may be stored on the computing device 104, for example, permissions and history settings.

In some examples, the computing device 104 may be asleep, in a low power mode or powered down, as no users are located in room 108. In this example, the computing device 102 may send a wake-up or activation command to the computing device 104 in anticipation of the user 112 entering room 108. In some instances, the computing device 104 may need to authenticate the user 112 before the call is transferred. In this instance, the computing device 102 may provide the authentication credentials (such as a password and user name, voice print, facial image, etc.) to the computing device 104. The computing device 104 may use the authentication credentials to verify the user 112, for example, against an internally stored authorized user list.

In other instances, the computing device 104, upon being awakened by computing device 102, may perform the authentication process without receiving authentication credentials from the computing device 102. For example, the computing device 104 may begin to capture sound from the environment and authenticating the user 112 based on speech recognition techniques. In other examples, the computing device 104 may capture visual information from the environment and authentic the user 112 based on facial recognition techniques. In one particular implementation, the computing device 104 may query the user, for instance, by asking "who is there" and authenticate the user 112 based on a spoken response and speech recognition software.

In another implementation, the computing device 104 may actively listen or watch for the user 112. For example, the computing device 104 may monitor the entry way to room 108 using one or more video capturing components. In another example, the computing device 104 may actively listen for sound and wake up upon detecting noise exceeding a threshold level. Once the noise is detected by the computing device 104, the computing device 104 may authenticate the user 112 and/or request the conversation to be transferred from the computing device 102.

Figure 2:
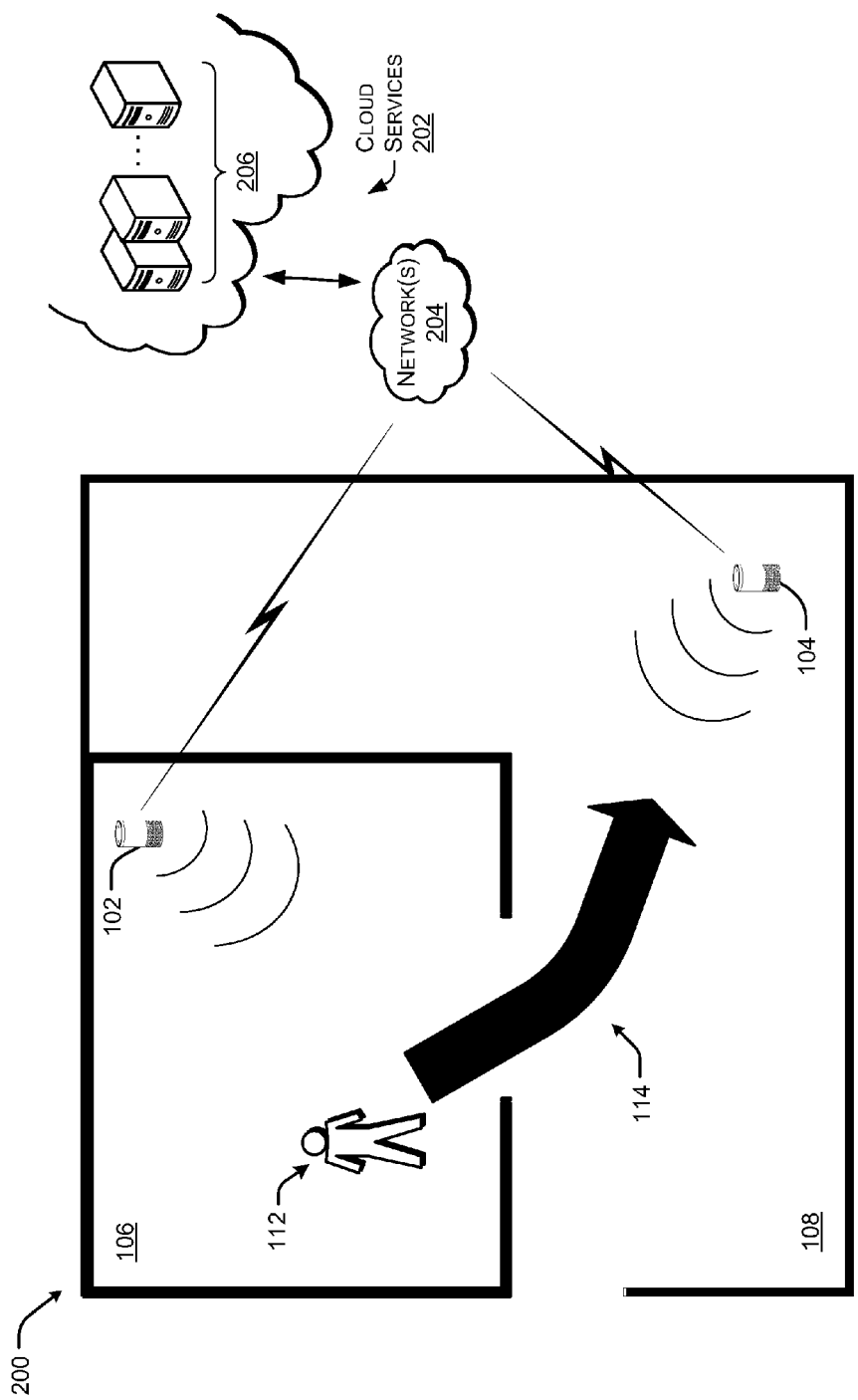
FIG. 2 illustrates another example environment including a home with multiple computing devices as in FIG. 1, but further including cloud-based resources to aid in the content transfer.

FIG. 1 provides an example environment including two computing device 102 and 104, which are configured to coordinate content transfer. FIG. 2 shows another example environment illustrating a system in which one or more cloud services are configured to aid in the content transfer between the computing device 102 and the computing device 104.

FIG. 2 illustrates another example environment including a home 200 with multiple computing devices 102 and 104 located in rooms 106 and 108, respectively. In the illustrated implementation, the computing devices 102 and 104 are in wireless communication with cloud services 202 via network 204. In other instances, the computing devices 102 and 104 may be in communication with the cloud services 202 through a wired communication system. The cloud services 202, generally, refer to a network accessible platform implemented as a computing infrastructure of processors, storage, software, data access, and so forth that is maintained and accessible via the network 204, such as the Internet. The cloud services 202 do not require end-user knowledge of the physical location and configuration of the system that delivers the services. Common expressions associated with cloud services include "on-demand computing," "software as a service (SaaS)," "platform computing," "network accessible platform" and so forth.

The cloud services 202 are implemented by one or more servers, such as servers 206. Additionally, the servers 206 may host any number of cloud based services 202, such as one or more services to coordinate content transfer between the computing devices 102 and the computing device 104, perform database searches, locate and consume/stream entertainment (e.g., games, music, movies and/or other content, etc.), aid in personal management tasks (e.g., calendaring events, taking notes, etc.), assisting in online shopping, conducting financial transactions, and so forth. These servers 206 may be arranged in any number of ways, such as server farms, stacks, and the like that are commonly used in data centers.

In one implementation, the computing device 102 and the computing device 104 are configured to facilitate communication between the user 112 and the cloud services 202, for example, to perform various tasks and/or to stream various media content into the home 200. In the illustrated example, the computing devices 102 and 104 are arranged throughout the home 200. Thus, the user 112 may move between rooms 106 and 108, while continuing to consume/access content and/or continue to perform one or more various tasks via the computing device 102 and 104.

In an example scenario, assume that the user 112 is listening to music streamed from cloud services 202 and output by the computing device 102 in room 106 and computing device 104 in room 108. As depicted in the illustrated example, the user 112 moves from room 106 to room 108 along path 114. As the user moves along path 114, the computing device 102 captures sounds related to the user movement (such as footsteps). The computing device 102 may provide the captured sound to the cloud services 202 and one or more of the cloud services 202 may determine the direction and movement of the user 112 by processing the capture sound. For example, the cloud services 202 may determine that the user 112 is moving into room 106 by detecting a direction related to the footsteps relative to the computing device 102. For instance, if the computing device 102 and a second computing device are both able to capture sounds related to the user and provide the sounds to the cloud services 202, the cloud services may compare the audio signal strength of the sounds related to the user as captured by both devices over time to determine the direction of movement. In another instance, the cloud service 202 may determine the direction of movement by monitoring the Doppler shift in the sound related to the user as provided by the computing device 102.

In response, the cloud services 116 may activate or wake the computing device 104 and begin to stream the music to computing device 104. In one particular example, the cloud services 202 may stream the music to both the computing device 102 and the computing device 104 for a predetermined period of time before completing the transfer to computing device 104. In this manner, the user 112 hears the music output from both the computing devices 102 and 104 as the user 112 is crossing the threshold between room 106 and 108. In another example, the cloud services 202 may stream the music to both the computing devices 102 and 104 until the cloud services 202 determine that the computing device 102 is no longer capturing sound related to the user 112.

In another implementation, the computing device 104 may monitor the room 108 for the presence of one or more users, such as user 112. Thus, as the user 112 moves along path 114 into room 108, the computing device 104 may detect the presence of user 112. For instance, the computing device 104 may detect the presence of the user 112 by monitoring a visual or audio input signal. In this implementation, the computing device 104 may notify the cloud services 202 that an unknown user has entered range.

The cloud services 202 may recognize the fact that the user 112 was previously in room 106 based on prior communications and transfer the content (i.e., the music) to the computing device 104, in response. In another example, the computing device 104 may provide the cloud services 202 the visual and/or audio input signal and the cloud services 202 may authenticate the identity of the user 112 (for instance, via facial or speech recognition techniques) and after authenticating the identity of user 112 cause the content to transfer from the computing device 102 to the computing device 104. For instance, the cloud services 202 may authentic the user 112, as the service for streaming music may require a logon and/or the various other services may include authentication requirements. For example, the authentication may be for email service which notifies the user 112 if an email is received, a calendar service which notify the user 112 of an upcoming appointment and/or a phone services which provide call routing, among others.

Figure 3:
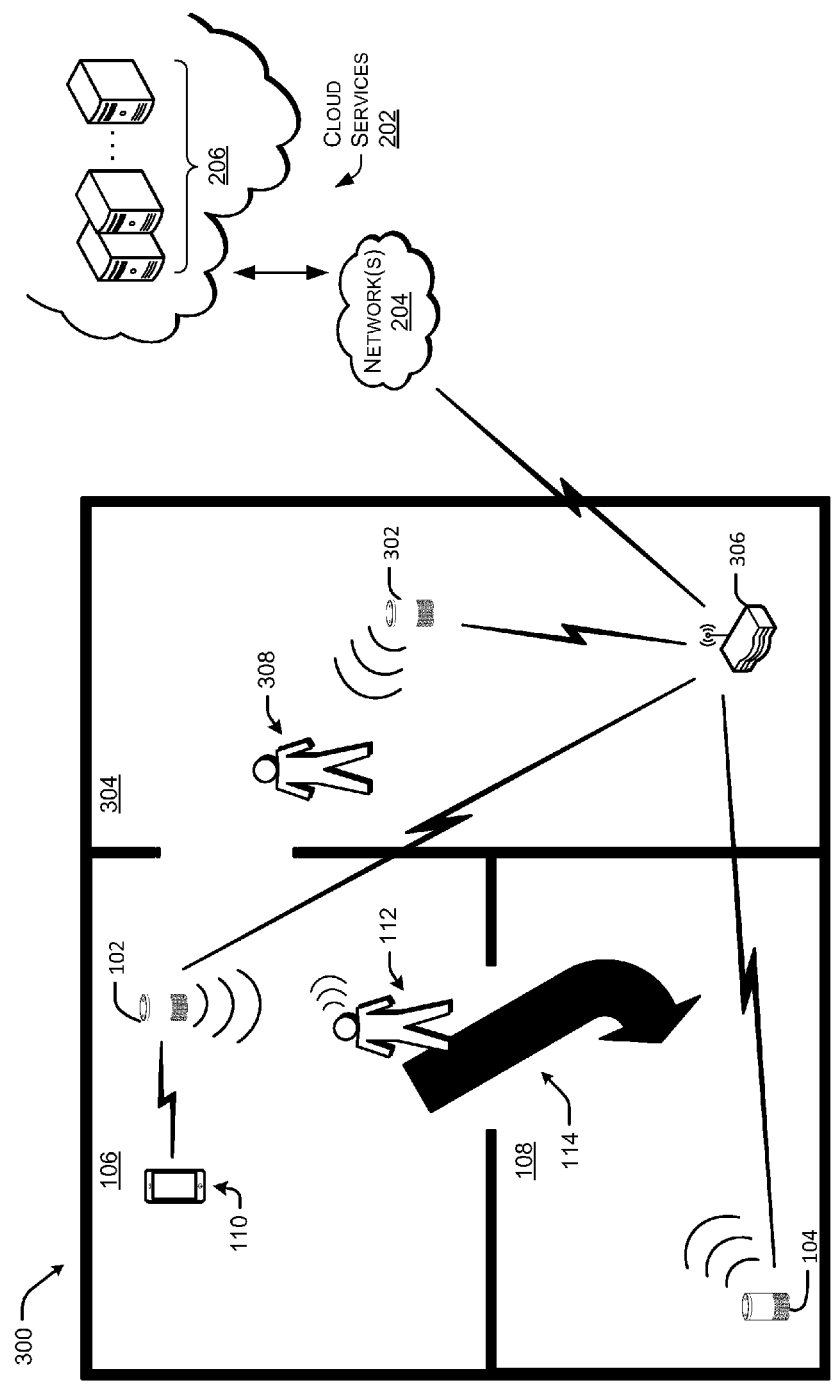
FIG. 3 illustrates yet another example environment including a home with multiple computing devices similar to that in FIG. 2, but further including an ad hoc network formed in the home to assist in the content transfer.

FIGS. 1 and 2 provide examples environments with a single user 112. FIG. 3 provides another example environment including a second user also utilizing the computing system to perform various tasks.

FIG. 3 illustrates an example environment including a home 300 with multiple computing devices 102, 104 and 302 located in rooms 106, 108 and 304, respectively. As discussed above, the computing devices 102, 104 and 302 may be implemented as any of a number of computing devices and in any number of ways, such as a wired or cellular telephones, various mobile and stationary computing devices, conferencing devices, various speaker systems, and/or any number of other electronic devices capable of capturing sound at one or more microphones and output audio at one or more speakers.

The illustrated example, also includes a router or wireless access point 306 in communication with each of the computing devices 102, 104 and 302, as well as, the cloud services 202 via network 204. In some cases, the wireless access point 306 may facilitate communication between the computing device 102, the computing device 104, the computing device 302, the mobile phone 110 and the cloud services 202. For example, the wireless access point 306 may act as a master device in an ad-hoc computer network between the computing devices 102, 104 and 302.

As discussed above with respect to FIG. 1, the computing device 102 is positioned in room 106 and the computing device 104 is positioned in room 108. The user 112 is participating in a phone conversation via mobile phone 110 located in the room 106, as the user 112 is moving along path 114. In this example, another computing device 302 is also streaming content, such as music, from the cloud services 202 to a user 308 in room 304.

Again, the user 112 may move from room 106 into room 108 along path 114, while conducting a conversation. As the user moves along path 114, the computing device 102 continues to capture sound related to the user 112, such as the voice of the user 112. The computing device 102 analyzes the captured sound to determine a distance of the user 112 from the computing device 102 and a direction of movement.

In one implementation, the computing device 102 may know the relative locations of the other devices (i.e., the locations of the computing device 104 and the computing device 302) and determine which of the devices 104 or 302 the user 112 is approaching. Thus, the computing device 104 may determine that the user 112 is entering room 108 and that the conversation should be relayed or transferred to the computing device 104. In this way, the user 112 experiences a seamless content transfer between the computing device 102 in room 106 and the computing device 104 in room 108.

In other implementations, the computing device 102 may not be aware of the locations of the computing devices 104 and 302 but may determine from analyzing the captured sound that the conversation should be transferred. In this instance, the computing device 102 may cause the computing device 104 and the computing device 302 to begin to monitor rooms 108 and 304 for the presence of one or more users and to verify the identity of any detected individuals. For example, the computing devices 104 and 106 may monitor and analyze visual and/or audio information to detect the presence of one or more users and verify the user's identity. Thus, in the illustrated example, the computing device 104 may identify user 112 and request that the conversation be transferred.

In one particular example, suppose the user 112 moves into room 304 occupied by user 308 who is streaming music via the computing device 302. In one example, the computing device 102 may determine that the user 112 is moving towards the computing device 302 and room 304, query the computing device 302 to notify the computing device 302 that user 112 is approaching and request that computing device 302 accept a transfer of the conversations. However, the computing device 302 may respond to the computing device 102 by indicating that the computing device 302 is busy, as the computing device 302 is streaming music for user 308. The computing device 102 may then notify the user 112 that room 304 is occupied and that the conversation cannot be transferred to computing device 302 at this time.

In another example, the computing device 302 may query the user 308 to determine if the computing device 102 may accept a transfer of the conversation from the computing device 102 before responding to the computing device 102. In one particular example, the system may perform conflict resolution between multiple users of a signal device based on a priority list. For instance, the computing device 302 may accept the transfer of the conversation from the computing device 102 even though user 308 is steaming music, as phone calls may be ranked higher than music on the priority list.

In other implementations, the cloud services 202 may receive and analyze visual and/or audio signals from each of the computing devices 102, 104 and 302 and coordinate the content transfer between the computing devices 102, 104 and 302 based on the visual and/or audio signals. For example, the cloud services 202 may compare the audio signal strength of sounds related to the user received from the computing devices 102, 104 and 302 and select the computing device with the strongest signal to transfer the content to. In another example, the cloud services 202 may determine a direction and location of the user by monitoring Doppler shifts in the sounds related to the user as received from each of the computing devices 102, 104 and 302.

Illustrative Architecture

Figure 4:
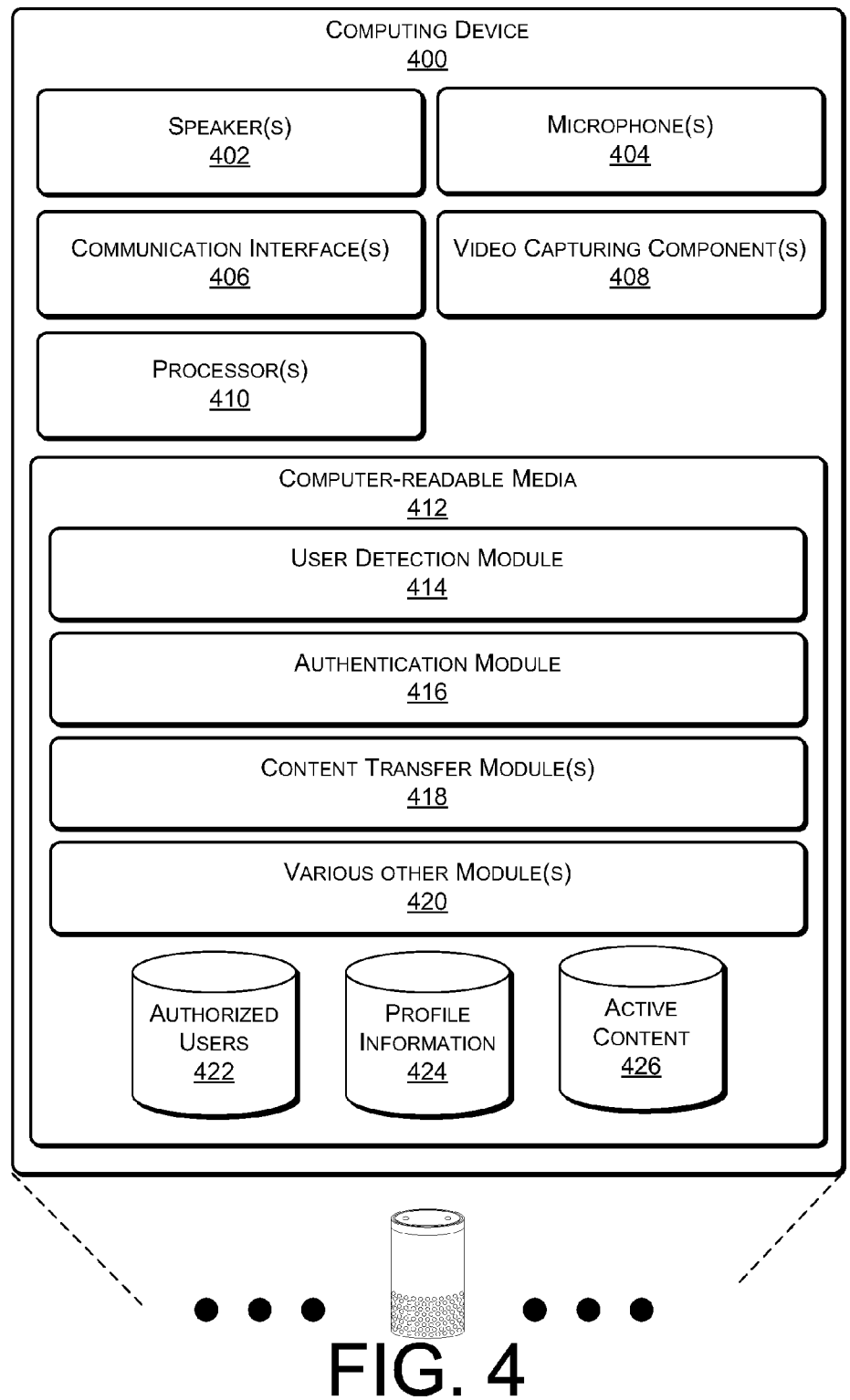
FIG. 4 illustrates an example architecture of a computing device, such as the computing devices in the environments of FIGS. 1-3.

FIG. 4 illustrates an example of a computing device 400, such as the computing devices 102, 104, and 302 of FIGS. 1-3. Generally, the computing device 400 may be implemented as a standalone device that is relatively simple in terms of functional capabilities with limited input/output components, memory and processing capabilities or as part of a larger electronic system.

The computing device 400, generally, includes one or more speakers 402 to reproduce audio signals as sound and one or more microphones 404 to capture sound from an environment and convert the sound into one or more audio signals. The microphones 404 may be a microphone array, a calibrated group of microphones, or multiple microphone arrays or calibrated groups. In some examples, microphones 404 may be incorporated with an analog-to-digital converter to convert the sound into digital microphone output signals for processing.

The computing device 400 also includes one or more communication interfaces 406 to facilitate communication between one or more networks (such as network 204 of FIGS. 2 and 3) and/or one or more cloud services (such as cloud services 202 of FIGS. 2 and 3). The communication interfaces 406 may also be configured to facilitate communication between one or more wireless access points, a master device and/or one or more other devices as part of an ad-hoc or home network system. The communication interfaces 406 may support both wired and wireless connection to various networks, such as cellular networks, radio, WiFi networks, short-range or near-field networks (e.g., Bluetooth®), infrared signals, local area networks, wide area networks, the Internet, and so forth.

In some implementations, the computing device 400 may optionally include one or more video capturing components 408. The video capturing components 408 may be one or more cameras and/or interfaces for receiving video and/or images of an environment in which the computing device 400 is located, such as rooms 106 and 108 of FIG. 1. Generally, the video capturing components 408 are configured to capture images of one or more users accessing or interacting with the computing device 102, which may be used to authentic the identity of the one or more users, for instance, by performing one or more facial recognition techniques to the image.

In the illustrated implementation, the computing device 400 includes, or accesses, components such as at least one control logic circuit, central processing unit, one or more processors 410, in addition to one or more computer-readable media 412 to perform the function of the computing device 400 and or store media content. Additionally, each of the processors 410 may itself comprise one or more processors or processing cores.

Depending on the configuration of the computing device 400, the computer-readable media 412 may be an example of tangible non-transitory computer storage media and may include volatile and nonvolatile memory and/or removable and non-removable media implemented in any type of technology for storage of information such as computer-readable instructions or modules, data structures, program modules or other data. Such computer-readable media may include, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processors 410.

Several modules such as instruction, data stores, and so forth may be stored within the computer-readable media 412 and configured to execute on the processors 410. User detection module 414 is configured to determine the presence of one or more users within the environment surrounding the computing device 400. For example, the user detection module 414 may be configured to analyze audio signals captured by the microphones 404, detect the proximity of a wireless signal of a device associated with a particular user and/or analyze a video feed or image captured/or received by the video capturing components 408 to identify the presence, location and/or direction of a user.

The computer-readable media 412 may also store an authentication module 416 to verify the identity of a particular user before making select services available via the computing device 400 and a content transfer module 418 to facilitate the transfer of content from one computing device to another. Various other modules 420 may also be stored on computer-readable storage media 412, such as a configuration module to assist in an automated initial configuration of the computing device 400, as well as operating module to manage hardware and services (e.g., communication interfaces, microphones, and speakers) within and coupled to the computing device 400 for the benefit of other modules.

In some implementations, the computer-readable media 412 stores a list of authorized users 422 and associated profile information 424, as well as, content 426. The list of authorized users 422 may include a white list of users who have permission to access the computing device 400, a black list of users who may not access the computing device 400 and/or a list of users who have utilized one or more services via the computing device 400. The associated profile information 424 may include an authentication credentials, permissions, subscriptions, logon credentials (i.e., passwords and user names), contact lists (e.g., emails, phone numbers, etc.), settings, preferences, play lists, lists/indexes of electronic consumable content (e.g., favorite applications, most visited websites, preferred media content, etc.), histories (such as shopping or browsing histories), health history, and/or personal information associated with each of the authorized users. The content 426 may be any application or content that a user is consuming via the computing device 400.

Generally, the computing device 400 is incorporated into a system including other computing devices located at various other locations within an environment. In one example, the computing device 400 is located within a room of a home and is configured to monitor the room by capturing audio information at the microphones 404 and/or visual information at the video capturing component 408. The audio information and the visual information is analyzed by the user detection module 414 to determine the presence of one or more users within the room.

If the user detection module 414 detects the presence of a user within the room, the audio and/or visual information is provided to the authentication module 416 to verify the identity of the user. For example, the authentication module 416 may cause the processors 410 to perform a facial recognition on the visual information and/or speech recognition on the audio information. In some cases, the authentication module 416 may cause the computing device 400 to initiate an audible query to the user such as "what is your name" using speakers 402 to elicit a specific response from the user, which may be verified using speech recognition techniques. In another case, the computing device 400 may initiate an audible command, such as "please look at the camera so that your identity can be verified," and perform facial recognition on the visual information captured by the video capturing component. In one particular implementation, the computing device 400 may be configured to detect a wireless signal from a personal digital assistant device (PDA) or a mobile phone and the authentication module 416 may be configured to utilize the proximity of the PDA as an authentication criteria.

Once the user's identity is verified, the authentication module 416 may confirm that the user is authorized to access the device 400 using the list of authorized users 422. For example, the device 400 may be located in a master bedroom and the home owners may not want the children using the computing device 400. Thus, the authorized users 422 may contain both a white list of authorized users, such as the parents, and a black list of users, such as the children.

In other implementations, the authentication module 416 may access the user's profile information 424 and configure the computing device 400 based on permissions, settings, preference, etc. stored in the profile information 424 associated with the identified user. For example, the computing device 400 may be located in the living room and the authorized uses 422 include all family members. However, the home owners may have parental controls associated with the children's profile. For instance, if the computing device 400 is being utilized to conduct an online transaction, the children may be unable to enter a credit card number.

In some instances, the authenticated user may be moving from another room. In this instance, the computing device 400 may execute the content transfer module 518, which causes the computing device 400 to query the other devices via the communication interfaces 406 to see if one of the other devices has content 426 associated with the authenticated user. If one of the other computing devices responds, the computing device 400 may receive the content 426 from the responding device and the content transfer module 518 causes the computing device 400 to output the content 426 substantially concurrently with the responding device, such that the user does not experience any lag or delay during the content transfer between devices.

Figure 5:
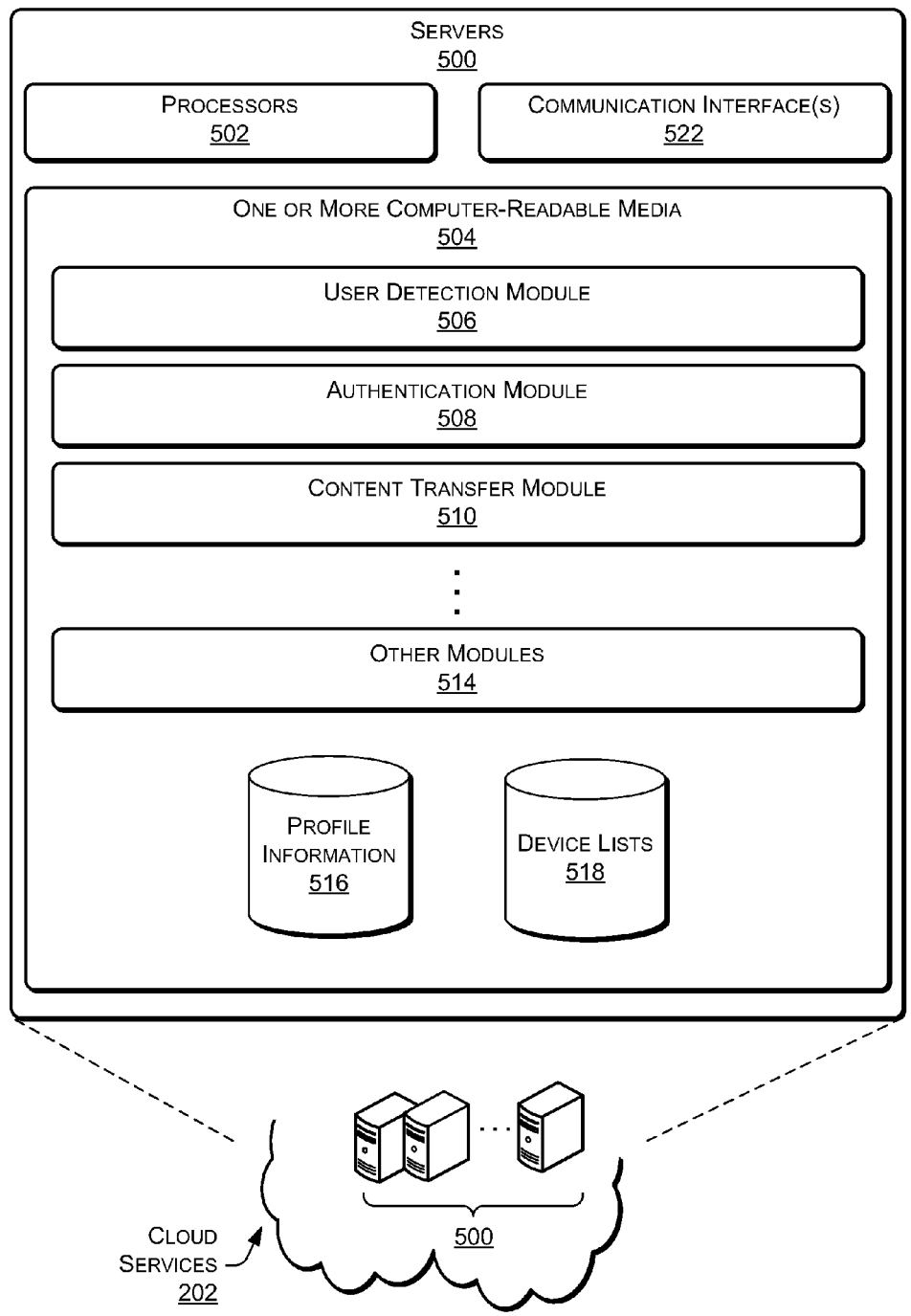
FIG. 5 illustrates an example architecture of one or more servers associated with the cloud services for coordinating content transfers between devices.

FIG. 5 illustrates an example architecture of one or more servers 500 associated with the cloud services 202 for coordinating content transfers between devices of a system (such as devices 102, 104, 302 and 400 of FIGS. 1-4). The servers 500 collectively comprise processing resources, as represented by processors 502, and computer-readable storage media 504. The computer-readable storage media 504 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device.

Several modules such as instruction, data stores, and so forth may be stored within the computer-readable media 504 and configured to execute on the processors 502. For example, a user detection module 506 is provided to detect the presence of a user near one or more computing devices, a authentication module 508 is provided to verify the identity of a user near one of the computing devices, a content transfer module 510 is provided to facilitate the transfer of content from one of the computing devices to another. Various other modules 514 may also be stored on computer-readable storage media 504.

The servers 500 may also store profile information 516 and device lists 518. The profile information 516 associated with each user may include includes an identity of the user, authentication credentials, permissions, subscriptions, logon credentials (i.e., passwords and user names), contact lists (e.g., emails, phone numbers, etc.), settings, preferences, play lists, lists/indexes of electronic consumable content (e.g., favorite applications, most visited websites, preferred media content, etc.), histories (such as shopping or browsing histories), health history, and/or personal information. The device lists 518 include lists of computing devices associated with particular systems and may include the location of the computing devices of each system relative to each other.

The servers 500 also include one or more communication interfaces 522, which may support both wired and wireless connection to various networks, such as cellular networks, radio, WiFi networks, short-range or near-field networks (e.g., Bluetooth®), infrared signals, local area networks, wide area networks, the Internet, and so forth. For example, the communication interfaces 522 may allow the cloud services 202 to stream audio to the computing devices.

In an example scenario, a first computing device (such as computing device 102 of FIG. 2) provides the servers 500 audio information and/or visual information. The servers may monitor the audio information and the visual information by executing the user detection module 506. The user detection module 506 may cause the processors 502 to determine the presence of a user within the environment surrounding the first computing device based on either the audio or video information. The servers 500 may also verify the identity of a detected user by executing the authentication module 508. For example, the authentication module 508 may perform speech recognition on the audio information or facial recognition on the visual information.

Upon confirming the identity of the user, the servers 500 may provide the first computing device profile information 518 associated with the user, such that the first computing device may apply settings and permissions associated with the user. The servers 500 may also ping one or more other computing device to determine if the identified user had any content on one of the other devices. For instance, if the user was holding a phone conversation via the second computing device and moved into range of the first computing device, the second computing device may respond to the servers 500. The servers 500 may then execute the content transfer module 510, to cause the second computing device to provide the conversation to the first computing device.

In another example, the servers 500 may be streaming one or more of the cloud services 202 to the second computing device. In this example, the servers 500 may execute the content transfer module 510, to cause the one or more cloud services 202 to stream to the first device in lieu of the second device.

Illustrative Processes

Figure 6:
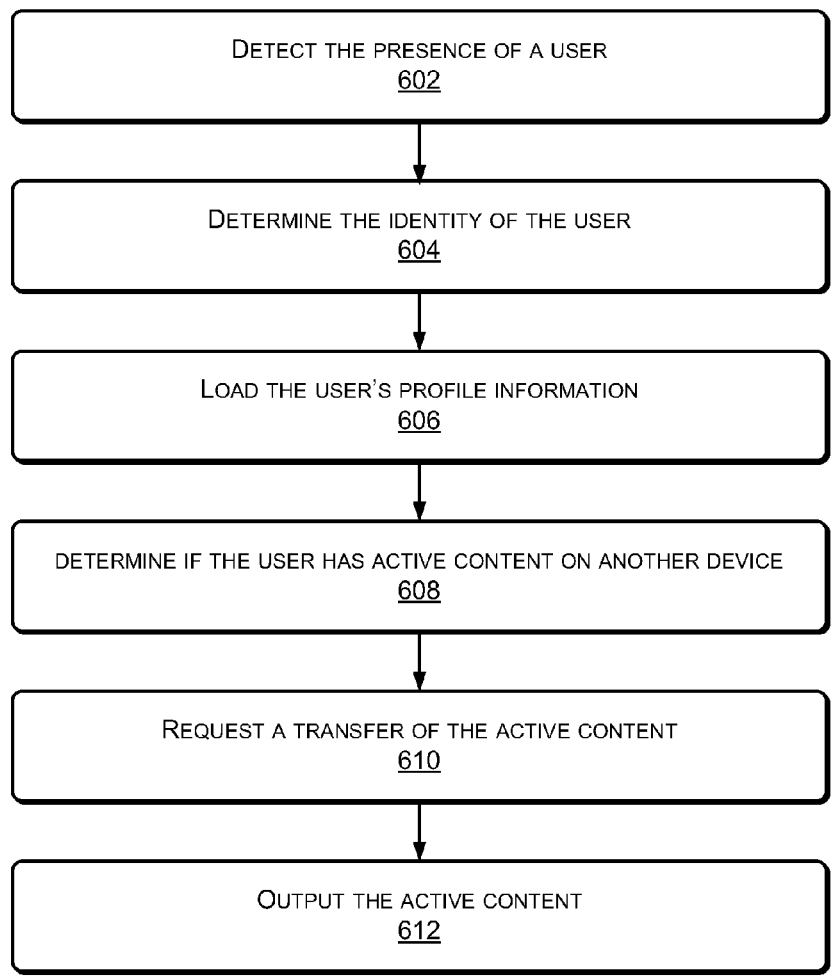
FIG. 6 is an example flow diagram showing an illustrative process to provide content transfer.
Figure 7:
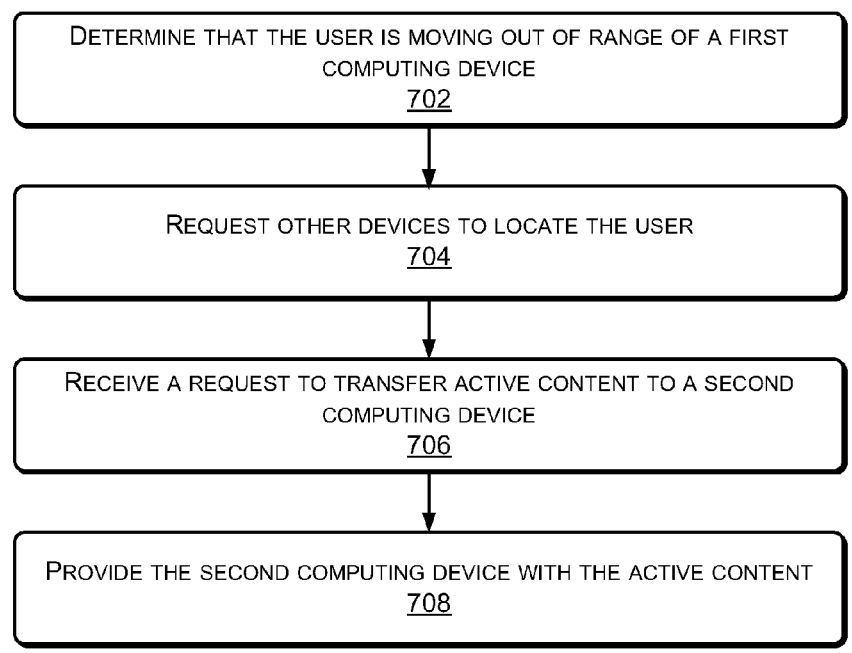
FIG. 7 is another example flow diagram showing an illustrative process to provide content transfer.

FIGS. 6 and 7 are a flow diagram illustrating example processes for providing content transfer. The processes are illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, which when executed by one or more processors, perform the recited operations. Generally, computer-executable instructions include routines, programs, objects, components, data structures and the like that perform particular functions or implement particular abstract data types.

The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

FIG. 6 is an example flow diagram showing an illustrative process 600 to provide content transfer. Generally, the process 600 is performed by a computing device, such as computing device 102, 104, or 302, as part of a system having multiple devices in communication with each other and/or one or more servers.

At 602, a computing device detects the presence of a user. For instance, the computing device may monitor an environment using one or more microphones and/or one or more video input components. The computing device may analyze the audio signal output by the microphones and the video signal output by the video input components to determine the presence of a user within the environment. In another example, the computing device may output an audio signal using one or more speakers and detect a change in the acoustical footprint of the room.

At 604, the computing device determines the identity of the user. For example, the computing device may perform speech recognition on the audio signal, facial or visual recognition on the video signal, produce an audible output to elicit a response, which may be used to verify the identity of the user and/or detect the presence one or more wireless devices associated with the user.

At 606, the computing device loads the user's profile information. For example, the computing device may access a user profile (either stored locally on the computing device or remotely on one or more servers) and apply various settings, permissions, and contact lists associated with the user and/or log the computing device on to various subscriptions and/or services.

At 608, the computing device determines if the user has content on another computing device. For example, the computing device may query the other devices of the system and/or one or more cloud services to determine if the user was previously accessing content via another device.

At 610, the computing device requests a transfer of the content. For example, the computing device may request one or more of the other devices of the system to relay a phone conversation to the computing device. In another example, the computing device may request that the one or more cloud services transfer any streaming content to the computing device.

At 612, the computing device outputs the content for consumption by the user, for example, by activating the speakers and microphones, such that the user may conduct the conversation via the computing device.

FIG. 7 is another example flow diagram showing an illustrative process 700 to provide content transfer. Generally, the process 700 may be performed by a computing device, such as computing device 102, 104, or 302, or by one or more of the cloud services, such as cloud services 202.

At 702, the cloud determines that the user is moving out of range of a first computing device. For example, the cloud services monitor and analyze sound captured by the first computing device to determine that a user has moved or is moving out of range.

At 704, the cloud services request the other devices of the system to locate the user. For example, the cloud services may request each of the devices to capture sound for a period of time following the request and to provide the captured sound to the cloud services. The cloud services may use the captured sound to determine the location of the user. In other examples, the cloud services may cause the other devices to emit an audible query asking the user for his/her location.

At 706, the cloud services receive a request to transfer the content from the first computing device to the second computing device, for instance, in response to the second device identifying the user's presence. In one implementation, the cloud services may identify the second computing device as the device to transfer the content on without receiving a request. For example, the cloud services may be able to identify the second computing device by inferring the user's direction from the audio signal and/or the video signal and a known layout of the user's environment and the computing devices.

At 708, the cloud services provide the second computing device with the content. For example, the cloud services may transfer music streaming to the first computing device to the second computing device.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims

What is claimed is:

1. A computing system comprising:
    a first computing device collocated in an environment with a second computing device, the first computing device comprising:
        at least one speaker to output content to a user;
        at least one microphone to capture sound and convert the sound into an audio signal;
        one or more communication interfaces to communicate with the second computing device;
        one or more processors; and
        computer-readable storage media storing computer-executable instructions, which when executed by the one or more processors cause the processors to:
            detect sound related to the user in the audio signal;
            determine an identity of the user by detecting a voice print of the user within the sound related to the user;
            monitor, at the first computing device, changes in a characteristic of the sound related to the user;
            determine a direction of movement of the user based at least in part on the changes in the characteristic of the sound related to the user;
            locate the second computing device in the environment;
            determine that the direction of movement of the user is substantially away from the first computing device; and
            cause the second computing device to output the content.

2. The computing system as recited in claim 1, wherein computer-readable storage media storing computer-executable instructions, which when executed by the one or more processors cause the processors to:
    determine a first volume level of the sound related to the user;
    receive a second volume level of the sound related to the user from the second computing device;
    detect that the first volume level falls below a threshold at the first computing device; and
    send a wake-up command to the second computing device.

3. The computing system as recited in claim 1, wherein locating the second computing device is based at least in part on a triangulation distance between the user, the first computing device, and the second computing device.

4. The computing system as recited in claim 1, wherein the one or more communication interfaces are in communication with at least one mobile communication device associated with the user and the content is received from the mobile communication device.

5. The computing system as recited in claim 1, wherein the first computing device continues to output the content.

6. The computing system as recited in claim 1, wherein the characteristic of the sound related to the user comprises a frequency.

7. A computing device comprising:
    at least one speaker to output content to a user;
    at least one microphone to capture information from an environment associated with the computing device;
    one or more transmitters and one or more receivers to communicate with a second device;
    one or more processors; and
    computer-readable storage media storing computer-executable instructions, which when executed by the one or more processors cause the processors to:
        detect a presence of the user in the environment based at least in part on sounds related to movement of the user captured from the environment;
        determine, at the computing device, that the user is moving in a direction substantially away from the computing device;
        locate the second device within the environment; and
        send the content to the second computing device.

8. The computing device as recited in claim 7, wherein the computer-readable storage media storing computer-executable instructions, which when executed by the one or more processors cause the processors to output the content using the at least one speaker.

9. The computing device as recited in claim 7, wherein the content is profile information associated with the user.

10. The computing device as recited in claim 7, wherein the computer-readable storage media storing computer-executable instructions, which when executed by the one or more processors cause the processors to adjust a volume associated with the at least one speaker based at least in part on a distance of the user to the computing device.

11. The computing device as recited in claim 7, wherein the computer-readable storage media storing computer-executable instructions, which when executed by the one or more processors cause the processors to determine an identity of the user based on the captured information.

12. The computing device as recited in claim 11, wherein the computer-readable storage media storing computer-executable instructions, which when executed by the one or more processors cause the processors to apply settings associated with the user, in response to determining the identity of the user.

13. The computing device as recited in claim 7, wherein detecting the presence of the user in the environment is also based at least in part on at least one of:
    performing speech recognition on the captured information;
    performing optical recognition on the captured information; or
    identifying the presence of a wireless signal of a device associated with the user.

14. The computing device as recited in claim 7, wherein determining that the user is moving in the direction substantially away from the computing device comprises:
    determining a change in at least one of an audio signal strength, a sound map, or an audio signal frequency associated with the sound.

15. The computing device as recited in claim 7, wherein computer-readable storage media storing computer-executable instructions, which when executed by the one or more processors cause the processors to:

send a command to the second computing device, the command causing the second computing device to query the user for an audible response;

in response to receiving the audible response, cause the second computing device to output the content.

16. A method comprising:

under control of one or more computer systems configured with executable instructions, providing audio content to a first computing device for consumption by a user of the first computing device;

receiving data from a sensor of the first computing device;

determining that the user is moving away from the first computing device based at least in part on the data from the sensor of the first computing device;

determining a location of a second computing device in response to determining that the user is moving away from the first computing device;

selecting the second computing device to output the audio content based at least in part on determining that the user is moving away from the first computing device; and sending the audio content to the second computing device.

17. The method as recited in claim 16, wherein the data from the sensor of the first computing device comprises at least one of audio data received from a microphone, visual data received from a camera, or a network signal received by a network interface.

18. The method as recited in claim 16, further comprising continuing to provide the audio content to the first computing device concurrently with providing the audio content to the second computing device.

19. The method as recited in claim 16, further comprising authenticating the user using the data received from a sensor of the second computing device.

20. The method as recited in claim 16, further comprising providing profile information associated with the user to the second computing device in addition to the audio content.

21. One or more non-transitory computer-readable media having computer-executable instructions that, when executed by one or more processors, cause the one or more processors to perform operations comprising:

receiving first information from a first device within an environment indicative of a user being present within the environment;

providing the first information to a remote system;

receiving content from the remote system;

causing output of the content on the first device;

receiving second information from the first device indicative of a user moving in a direction substantially away from the first device;

providing the second information to the remote system;

determining a location of a second device within the environment based at least in part on the user moving in the direction substantially away from the first device; and sending the content on the second device.

22. The one or more non-transitory computer-readable media as recited in claim 21, wherein the first information also includes audio data related to movement of the user.

23. The one or more non-transitory computer-readable media as recited in claim 21, wherein the first information also includes visual data of the user.

24. The one or more non-transitory computer-readable media as recited in claim 21, further having computer-executable instructions that, when executed by one or more processors, cause the one or more processors to perform operations comprising:

receiving authentication credentials from the user;

providing the authentication credentials to the remote system; and outputting the content once the user is authenticated.

\* \* \* \* \*